(12) United States Patent
Li

(10) Patent No.: US 11,765,102 B2
(45) Date of Patent: Sep. 19, 2023

(54) NETWORK DEVICE AND CONVERSION APPARATUS

(71) Applicant: New H3C Technologies Co., Ltd., Zhejiang (CN)

(72) Inventor: Yuewu Li, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 218 days.

(21) Appl. No.: 17/293,179

(22) PCT Filed: Nov. 26, 2019

(86) PCT No.: PCT/CN2019/120843
§ 371 (c)(1),
(2) Date: May 12, 2021

(87) PCT Pub. No.: WO2020/108467
PCT Pub. Date: Jun. 4, 2020

(65) Prior Publication Data
US 2022/0014479 A1     Jan. 13, 2022

(30) Foreign Application Priority Data
Nov. 27, 2018  (CN) .......................... 201811422473.5

(51) Int. Cl.
*H04L 49/9057*     (2022.01)
*H04L 49/351*      (2022.01)
(Continued)

(52) U.S. Cl.
CPC .......... *H04L 49/103* (2013.01); *H04L 1/0061* (2013.01); *H04L 49/351* (2013.01);
(Continued)

(58) Field of Classification Search
None
See application file for complete search history.

(56) References Cited

U.S. PATENT DOCUMENTS 5,935,268 A * 8/1999 Weaver ................. H03M 13/35
714/758
10,798,059 B1 * 10/2020 Singh ..................... H04L 63/029
(Continued)

FOREIGN PATENT DOCUMENTS

CN     101583119 A     11/2009
CN     101605093 A     12/2009
(Continued)

OTHER PUBLICATIONS

State Intellectual Property Office of the People's Republic of China, Office Action and Search Report Issued in Application No. 2018114224735, dated Apr. 27, 2020, 10 pages.
(Continued)

*Primary Examiner* — Duc T Duong
(74) *Attorney, Agent, or Firm* — GREENBLUM & BERNSTEIN, P.L.C.

(57) ABSTRACT

A network device includes a switch chip and a CPU, wherein the switch chip at least includes a CPU interface, and the CPU at least includes a media access controller and a Buffer. The network device further includes a conversion apparatus. The conversion apparatus receives a first packet uploaded by the switch chip to the CPU through the CPU interface, obtains a second packet by migrating a private information header in an Ethernet header of the first packet to a specified position of the first packet, calculates a Cyclic Redundancy Check, CRC, code of the second packet, obtains a third packet by replacing a CRC code already carried in the second packet with the calculated CRC code, and sends the third packet to the Buffer on the CPU for buffering, wherein the specified position is a position other than the Ethernet header in the first packet.

12 Claims, 6 Drawing Sheets

(51) Int. Cl.
*H04L 69/22* (2022.01)
*H04L 49/103* (2022.01)
*H04L 1/00* (2006.01)
*H04L 49/9047* (2022.01)
*H04L 69/06* (2022.01)
*H04L 69/00* (2022.01)

(52) U.S. Cl.
CPC .......... *H04L 49/9047* (2013.01); *H04L 69/06* (2013.01); *H04L 69/22* (2013.01); *H04L 69/26* (2013.01)

(56) References Cited

U.S. PATENT DOCUMENTS

| | | | |
|---|---|---|---|
| 2004/0015598 A1* | 1/2004 | Lin | H04L 49/90 709/251 |
| 2005/0041664 A1 | 2/2005 | Goode et al. | |
| 2008/0091857 A1* | 4/2008 | McDaniel | H04L 63/123 710/72 |
| 2013/0064095 A1* | 3/2013 | Chew | H04L 43/50 370/241 |
| 2013/0315254 A1 | 11/2013 | Dacosta et al. | |
| 2018/0219980 A1* | 8/2018 | McCulley | H04L 1/0006 |
| 2019/0222552 A1 | 7/2019 | Xiao et al. | |

FOREIGN PATENT DOCUMENTS

| | | |
|---|---|---|
| CN | 102170389 A | 8/2011 |
| CN | 102194087 A | 9/2011 |
| CN | 103701828 A | 4/2014 |
| CN | 104038403 A | 9/2014 |
| CN | 104065582 A | 9/2014 |
| CN | 104270309 A | 1/2015 |
| CN | 107370654 A | 11/2017 |
| CN | 107872542 A | 4/2018 |
| CN | 108055202 A | 5/2018 |
| CN | 108390812 A | 8/2018 |
| EP | 1641169 A1 | 3/2006 |
| JP | 2002508124 A | 3/2002 |
| JP | 2011071701 A | 4/2011 |
| JP | 2016005284 A | 1/2016 |
| WO | 9900737 A2 | 1/1999 |
| WO | 2016119734 A1 | 8/2016 |

OTHER PUBLICATIONS

ISA State Intellectual Property Office of the People's Republic of China, International Search Report Issued in Application No. PCT/CN2019/120843, dated Feb. 21, 2020, WIPO, 4 pages.

Jianliang Ma et al, "Analyzing Memory Access on CPU-GPGPU Shared LLC Architecture",14th International Symposium on Parallel and Distributed Computing, Jul. 23, 2015, 10 pages.

Xiaoliang Hong, "Research on Survivability of the Information Service System in Military Training Information Network Data Center",China Master's Theses Full-text Database,Information Technology, Jul. 15, 2010, 74 pages.

Joey J. Syu et al, "Information Management and Platform Refinement for Big Data",2015 International Conference on Cloud Computing and Big Data, Apr. 11, 2016, 5 pages.

Zhi Tang et al, "Implementation of Protocol Packet Protection in Layer 3 Switch",Information security and communication confidentiality,No. 7, Jul. 31, 2006, 3 pages.

Wu Liu, "Research on the Transformation Between WSP and HTTP Based on the Message Type",China Master's Theses Full-text Database,Information Technology, Mar. 15, 2006, 75 pages.

Sukai YIN, "Research on Network Information Hiding Technology in SDN",China Master's Theses Full-text Database, Information Technology, Jul. 15, 2017, 85 pages.

European Patent Office, Extended European Search Report Issued in Application No. 19889431.3, dated Dec. 16, 2021, Germany, 8 pages.

ISA State Intellectual Property Office of the People's Republic of China, Written Opinion of the International Searching Authority Issued in Application No. PCT/CN2019/120843, dated Feb. 21, 2020, WIPO, 10 pages.

Japanese Patent Office Action, Office Action Issued in Application No. 2021-518774, dated May 10, 2022, 4 pages. (Submitted with Machine Translation).

* cited by examiner

NETWORK DEVICE AND CONVERSION APPARATUS

CROSS REFERENCE TO RELATED APPLICATIONS

This application is the national phase application of International Application No. PCT/CN2019/120843, filed on Nov. 26, 2019, the entire contents of which are incorporated herein by reference for all purposes.

BACKGROUND

Generally, a network device includes a switch chip and a Central Processing Unit (CPU). When sending a packet to the CPU, the switch chip firstly adds a private information header in an Ethernet header of the packet according to a private protocol, and then sends the packet carrying the private information header to the CPU, so that the CPU obtains packet characteristics from the private information header of the packet. Information related to the packet characteristics may include a Virtual Local Area Network (VLAN) to which the packet belongs, Quality of Service (QoS) of the packet, interface information of a peripheral interface receiving the packet, and the like.

Since different switch chips may adopt different private protocols, the CPU cannot normally identify the packets due to the private information headers carried in the Ethernet header of the packets after receiving the packets, thereby affecting diversion of the packets by the CPU.

BRIEF DESCRIPTION OF THE DRAWINGS

The accompanying drawings, which are incorporated in and constitute a part of the present specification, illustrate examples consistent with the present disclosure and serve to explain the principles of the present disclosure together with the specification.

DETAILED DESCRIPTION OF THE EMBODIMENTS

To understand the objects, technical solutions and advantages of the present disclosure more clearly, the present disclosure will be described in detail below in combination with drawings and specified examples.

Figure 1:
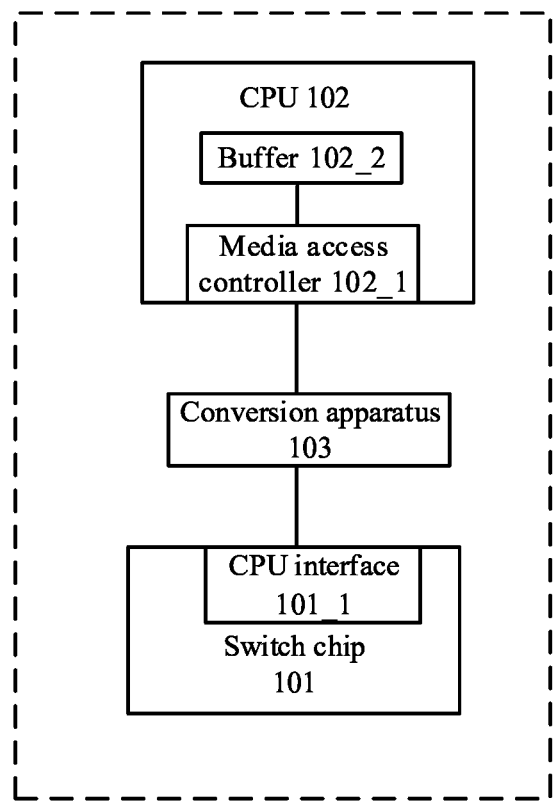
FIG. 1 is a schematic diagram illustrating a structure of a network device according to an example of the present disclosure.

FIG. 1 is a schematic diagram illustrating a structure of a network device according to an example of the present disclosure. As shown in FIG. 1, the network device may include a switch chip 101, a CPU 102 and a conversion apparatus 103. The conversion apparatus 103 herein may be implemented by software or hardware. When the conversion apparatus 103 is implemented by software, the conversion apparatus 103 may be applied to an apparatus including a processor and a storage medium. The functions of the conversion apparatus 103 may be implemented by reading machine executable codes stored in the storage medium through the processor. When the conversion apparatus 103 is implemented by hardware, the conversion apparatus 103 may be, for example, a Field Programmable Gate Array (FPGA) chip. The implementation of the conversion apparatus 103 is not limited specifically herein.

As shown in FIG. 1, the switch chip 101 has a CPU interface 101_1. The switch chip 101 may upload a packet to the CPU 102 and receive a packet from the CPU 102 through the interface. The CPU 102 at least includes a Media Access Controller (MAC) 102_1 and a buffer 102_2.

In FIG. 1, the conversion apparatus 103 receives a first packet that is sent by the switch chip 101 through the CPU interface 101_1 and is to be uploaded to the CPU 102, obtains a second packet by migrating a private information header in an Ethernet header of the first packet to a specified position of the first packet, calculates a Cyclic Redundancy Check (CRC) code of the second packet, obtains a third packet by replacing a CRC code already carried in the second packet with the calculated CRC code, and sends the third packet to the buffer on the CPU for buffering. It is to be noted that the above first to third packets are named only for distinguishing convenience rather than for limitation.

In an application, a packet is usually identified by analyzing an Ethernet header of the packet. The Ethernet header may include a data link layer header (also referred to as a layer-2 header), an IP header (also referred to as a layer-3 header) and a TCP/UDP header (also referred to as a layer-4 header). Based on this, the above specified position may be a position other than the Ethernet header in this example.

Figure 2:
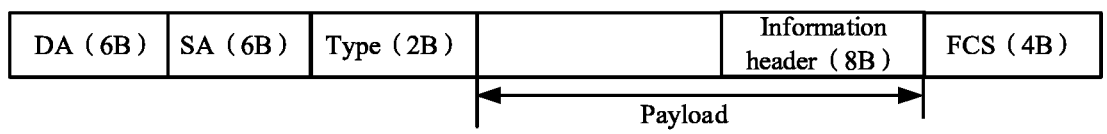
FIG. 2 is a schematic diagram illustrating a private information header located at a specified position according to an example of the present disclosure.

In an example, the above specified position may be, for example, the last N idle bytes in an Ethernet Payload of the packet without affecting original contents of the packet, where N refers to the number of bytes occupied by the private information header. FIG. 2 exemplifies a schematic diagram of a private information header located at a specified position according to an example of the present disclosure.

Thus, descriptions of the structure of the network device shown in FIG. 1 are completed.

It can be seen from the structure of the network device shown in FIG. 1 that, in an example of the present disclosure, the conversion apparatus 103 migrates the private information header originally carried in the Ethernet header of the packet to the position other than the Ethernet header in the packet. In this case, even if the packet carries the private information header, identification of the packets by the CPU is not affected. Further, normal diversion of the packets by the CPU is also not affected.

The structure of the network device according to the examples of the present disclosure is described below with four specific examples.

Example 1

Figure 3:
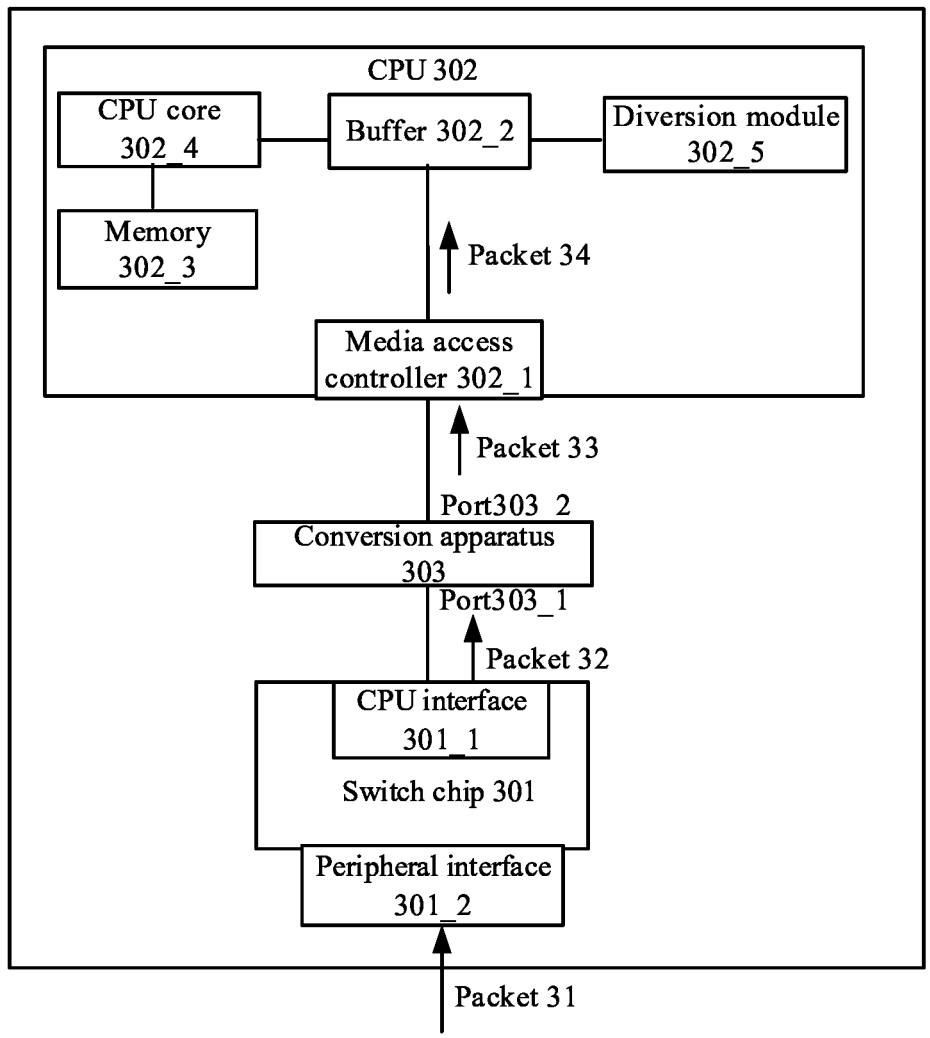
FIG. 3 is a schematic diagram illustrating a structure of a network device according to a first example of the present disclosure.

FIG. 3 is a schematic diagram illustrating a structure of a network device according to an example of the present disclosure. As shown in FIG. 3, the network device may include a switch chip 301, a CPU 302 and a conversion apparatus 303. As an example, the network device includes one switch chip.

As shown in FIG. 3, the switch chip 301 may include a CPU interface 301_1 and a peripheral interface 301_2. The number of the peripheral interfaces 301_2 herein is greater than or equal to 1. The peripheral interface is configured to receive a packet outside the switch chip 301 and send a packet to the outside of the switch chip 301.

As shown in FIG. 3, the CPU 302 at least includes a media access controller 302_1, a buffer 302_2, a memory 302_3, a CPU core 302_4 and a diversion module 302_5. The number of the CPU cores 302_4 is greater than or equal to 1.

In this example, as shown in FIG. 3, the conversion apparatus 303 is connected between the CPU interface 301_1 and the media access controller 302_1. One interface Port 303_1 of the conversion apparatus 303 is connected with the CPU interface 301_1, and the other interface Port 3032 is connected with the media access controller 302_1.

Based on the above structure, how the packet is sent from the switch chip 301 to the CPU 302 is described below.

As shown in FIG. 3, the switch chip 301 receives a packet through the peripheral interface Port 301_2. For convenience of description, the packet herein may be denoted as a packet 31.

Figure 4:
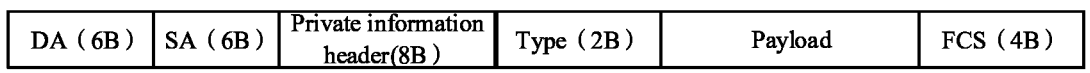
FIG. 4 is a schematic diagram illustrating a format of a packet carrying a private information header according to an example of the present disclosure.

When determining that the packet 31 is to be uploaded to the CPU 302, the switch chip 301 may add a private information header in an Ethernet header of the packet 31 in a preset manner in which the private information header is added. As shown in FIG. 4, the private information header may be added after a destination MAC address and a source MAC address. The private information header herein includes the following packet characteristic information: a VLAN to which the packet 31 belongs, QoS of the packet 31, interface information Port 301_2, and the like. For convenience of description, the packet 31 added with the private information header herein is denoted as a packet 32.

The switch chip 301 sends the packet 32 through CPU interface 301_1.

The interface Port 303_1 of the conversion apparatus 303 is connected with the CPU interface 301_1. When the switch chip 301 sends the packet 32 through the CPU interface 301_1, the conversion apparatus 303 receives the packet 32 through the interface Port 303_1.

The conversion apparatus 303 receives the packet 32 through the interface Port 303_1, identifies a private information header from an Ethernet header of the packet 32 in a locally-recorded manner in which the private information header is identified, and then processes the packet 32 as follows: migrating the identified private information header from the Ethernet header to a specified position of the packet 32 and re-calculating a CRC code of the packet 32 after the private information header is migrated, and updating a CRC code already carried in the packet 32 with the re-calculated CRC code. The manner in which the private information header is identified herein corresponds to the manner in which the switch chip 301 adds the private information header. The manner in which the private information header is identified may be pre-configured in the conversion apparatus 303, or may be identified by the conversion apparatus 303 according to a chip identifier of the switch chip 301.

In this example, the specified position being the last N idle bytes in the Payload of the packet 32 is taken as an example, where N refers to the number of bytes occupied by the private information header.

For convenience of description, the packet 32 which has been processed by the conversion apparatus 303 is denoted as a packet 33.

The conversion apparatus 303 sends the packet 33 through the interface Port 303_2.

The interface Port 303_2 of the conversion apparatus 303 is connected with the media access controller 302_1 of the CPU 302. Thus, after the conversion apparatus 303 sends the packet 33 through the interface Port 303_2, the media access controller 302_1 of the CPU 302 receives the packet 33.

After receiving the packet 33, the media access controller 302_1 processes the packet 33. The media access controller 302_1 may process the packet 33 according to a standard Ethernet MAC definition, the process mainly including packetizing the packets 33 according to the standard Ethernet MAC definition and the like, which is not limited specifically herein. For convenience of description, the processed packet 33 herein is denoted as a packet 34.

The media access controller 302_1 buffers the packet 34 to the buffer 302_2.

Thus, the private information header in the packet 34 buffered in the buffer 302_2 is at the end of the Payload of the packet 34.

In this example, when it is required to obtain packet characteristic information in the private information header in the packet 34, the CPU core 302_4 may read instruction codes from the memory 302_3, and obtain the packet characteristic information in the private information header in the packet 34 by running the instruction codes. The memory 302_3 pre-stores the above instruction codes. As described above, the packet characteristic information herein mainly includes a VLAN to which the packet 31 belongs, QoS of the packet 31, interface information Port 301_2, and the like.

After obtaining the packet characteristic information, the CPU core 302_4 may set a packet control strategy and the like based on the obtained packet characteristic information. In this example, an operation performed after the packet characteristic information is obtained is not limited specifically.

In this example, when it is required to divert the packets 34, the diversion module 302_5 may obtain the packets 34 from the buffer 302_2. The private information header of the packet 34 is at the end of the Payload (the last N idle bytes in the Payload) of the packet 34, which does not affect the identification and diversion of the packets 34 by the diversion module 302_5. Therefore, the diversion module 302_5 may normally divert the packets 34 in an existing diversion manner to allocate the packets 34 to a corresponding packet queue. Specifically, the diversion module 302_5 may divert the packets 34 as follows. The diversion module 302_5 may determine a priority of the packet 34 according to the information in the Ethernet header of the packet 34 and place the packet 34 in a packet queue corresponding to the priority. In this example, different packet queues may be scheduled by a same CPU core, or may be scheduled by different CPU cores, which is not limited specifically herein.

As can be seen, in this example, the conversion apparatus 303 migrates the private information header originally carried in the Ethernet header of the packet to the specified position that is other than the Ethernet header in the packet and does not affect packet identification. In this case, even if the packet carries the private information header, identification and normal diversion of the packets by the CPU (specifically. the diversion module 302_5) will not be affected since the private information header is located at a position that is in the packet and does not affect packet identification.

Thus, descriptions of the first example are completed.

Example 2

Figure 5:
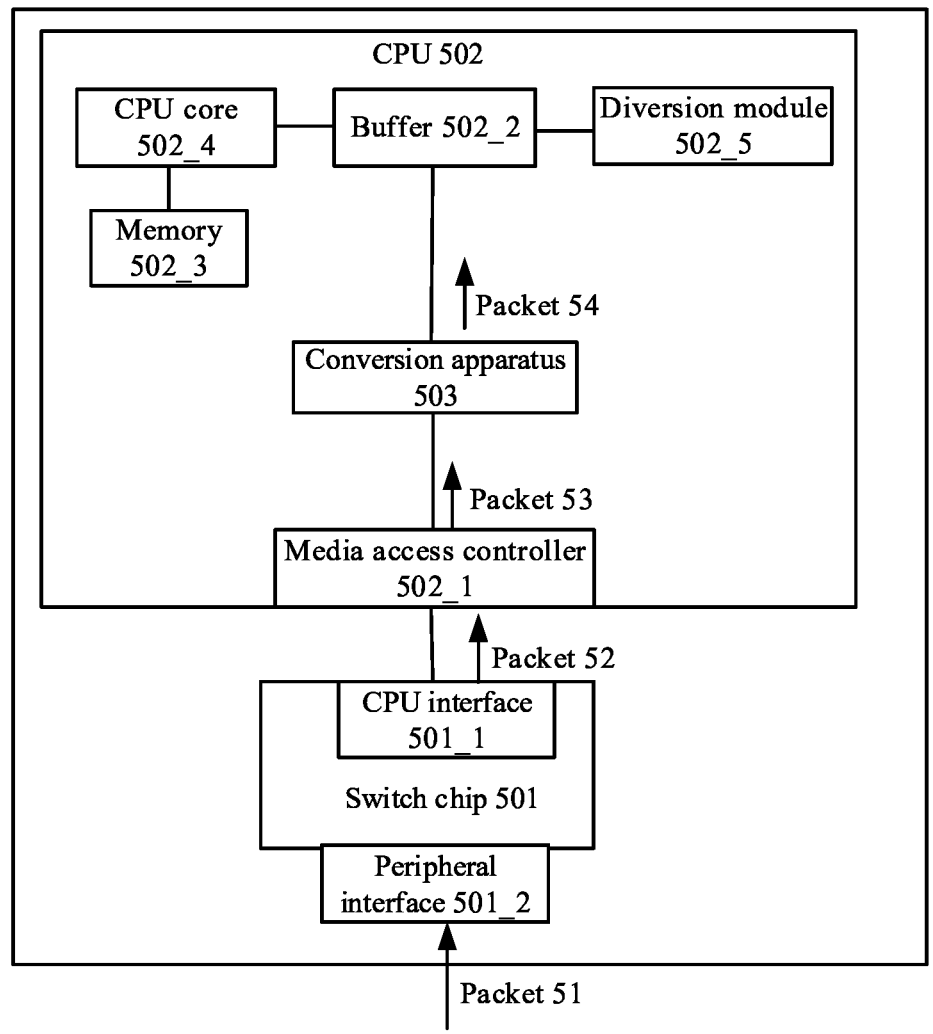
FIG. 5 is a schematic diagram illustrating a structure of a network device according to a second example of the present disclosure.

FIG. 5 is a schematic diagram illustrating a structure of a network device according to the second example of the present disclosure. As shown in FIG. 5, the network device may include a switch chip 501, a CPU 502 and a conversion apparatus 503. As an example, the network device includes one switch chip.

As shown in FIG. 5, the switch chip 501 may include a CPU interface 501_1 and a peripheral interface 501_2.

The CPU 502 at least includes a media access controller 502_1, a buffer 502_2, a memory 502_3, a CPU core 502_4 and a diversion module 502_5.

In this example, the CPU interface 501_1 of the switch chip 501 is connected with the media access controller 502_1 of the CPU 502.

In this example, the conversion apparatus 503 is connected between the media access controller 502_1 and the buffer 5022.

Based on the above structure, how a packet is sent from the switch chip 501 to the CPU 502 is described below.

As shown in FIG. 5, the switch chip 501 receives a packet through the peripheral interface 501_2. For convenience of description, the packet herein may be denoted as a packet 51.

When determining that the packet 51 is to be uploaded to the CPU 502, the switch chip 501 adds a private information header in an Ethernet header of the packet 51 in a processing manner similar to that of the above switch chip 301. The added private information header is as shown in FIG. 4. For convenience of description, the packet 51 added with the private information header herein is denoted as a packet 52.

The switch chip 501 sends the packet 52 through the CPU interface 501_1.

The CPU interface 501_1 of the switch chip 501 is connected with the media access controller 502_1 of the CPU 502. When the switch chip 501 sends the packet 52 through the CPU interface 501_1, the media access controller 502_1 of the CPU 502 receives the packet 52.

After receiving the packet 52, the media access controller 502_1 processes the packet 52. The manner in which the media access controller 502_1 processes the packet 52 herein is similar to the manner in which the media access controller 302_1 processes the packet in the first example. For convenience of description, the processed packet 52 herein is denoted as a packet 53.

The media access controller 502_1 sends the packet 53 to the buffer 502_2.

The conversion apparatus 503 is connected between the media access controller 502_1 and the buffer 502_2. When the media access controller 502_1 sends the packet 53 to the buffer 502_2, the conversion apparatus 503 located between the media access controller 502_1 and the buffer 502_2 will receive the packet 53 earlier than the buffer 502_2.

When receiving the packet 53, the conversion apparatus 503 identifies the private information header from the Ethernet header of the packet 53 in a locally recorded manner in which the private information header is identified, and then processes the packet 53 as follows: migrating the identified private information header from the Ethernet header to a specified position of the packet 53 and re-calculating a CRC code of the packet 53 after the private information header is migrated, and updating a CRC code already carried in the packet 53 with the re-calculated CRC code. In this example, the specified position being the last N idle bytes in the Payload of the packet 53 is taken as an example, where N refers to the number of bytes occupied by the private information header.

For convenience of description, the packet 53 which has been processed by the conversion apparatus 503 is denoted as a packet 54.

The conversion apparatus 503 buffers the packet 54 to the buffer 502_2. Thus, the private information header in the packet 54 buffered in the buffer 502_2 is at the end of the Payload of the packet 54.

In this example, when it is required to obtain packet characteristic information in the private information header in the packet 54, the CPU core 502_4 obtains the packet characteristic information in the private information header in the packet 54 by performing the same operation as performed by the CPU core 302_4.

In this example, when it is required to divert the packets 54, the diversion module 502_5 diverts the packets 54 by performing the same operation as performed by the diversion module 302_5.

It can be seen that, in this example, the conversion apparatus 503 migrates the private information header originally carried in the Ethernet header of the packet to the position that is other than the Ethernet header in the packet and does not affect packet identification. In this case, even if the packet carries the private information header, since the private information header is at a position in the packet that does not affect packet identification, the identification and normal diversion of the packets by the CPU (specifically, the diversion module 302_5) are not affected.

Thus, descriptions of the second example are completed.

Example 3

Figure 6:
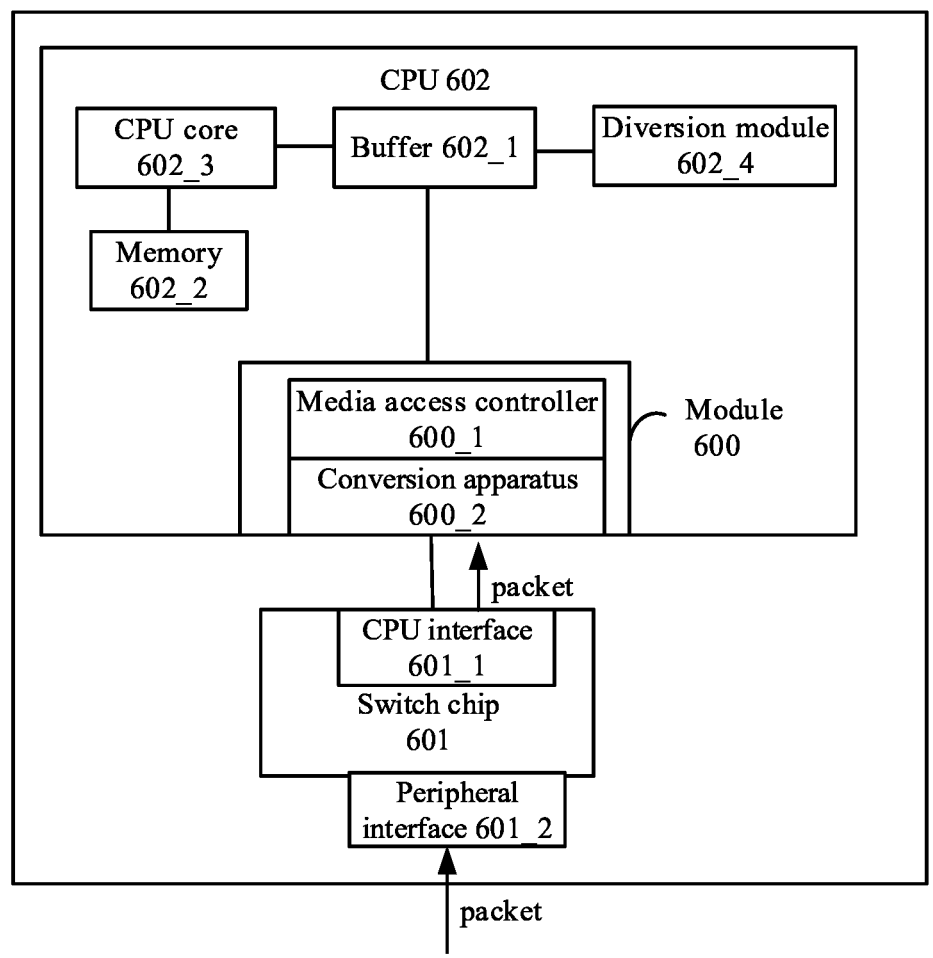
FIG. 6 is a schematic diagram illustrating a structure of a network device according to a third example of the present disclosure.

FIG. 6 is a schematic diagram illustrating a structure of a network device according to the third example of the present disclosure. As shown in FIG. 6, the network device may include a switch chip 601 and a CPU 602. As an example, the network device includes one switch chip.

In the third example, a structure of the switch chip 601 is similar to structures of the switch chip 301 and the switch chip 501, which is not described herein.

In the third example, the CPU 602 at least includes a module 600, a buffer 602_1, a memory 602_2, a CPU core 602_3 and a diversion module 602_4. The module 600 includes a media access controller 600_1 and a conversion apparatus 600_2.

In the third example, the media access controller 600_1 and the conversion apparatus 600_2 may be configured in the module 600 according to the following principle 1. The principle 1 requires the conversion apparatus 600_2 to receive a packet from the switch chip 601 earlier than the media access controller 600_1.

Based on this, when receiving the packet from the switch chip 601, the conversion apparatus 600_2 may process the packet in the manner in which the conversion apparatus processes the packet in the first example. Finally, the private information header in the packet buffered in the buffer 602_1 is located at the specified position (for example, at the end of the Payload) of the packet.

In the third example, the CPU core 602_3 and the diversion module 602_4 may process the packet in the manner in which the CPU core and the diversion module process the packet in the first or second example respectively.

Thus, descriptions of the third example are completed.

It is to be noted that, in this example, the media access controller 600_1 and the conversion apparatus 600_2 may also be configured in the module 600 according to the following principle 2. The principle 2 requires the media access controller 600_1 to receive the packet from the conversion chip 601 earlier than the conversion apparatus 600_2. In this case, when receiving the packet from the switch chip 601, the conversion apparatus 600_2 may process the packet in the manner in which the conversion apparatus processes the packet in the second example. Finally, the private information header in the packet buffered in the buffer 602_1 is located at the specified position (for example, at the end of the Payload) of the packet.

In the above first to third examples, the network device includes one switch chip. However, when the network device includes M switch chips and M is greater than 1, the processing manner of the network device is similar to the case that the network device includes one switch chip, which will be described below with a fourth example.

Example 4

Figure 7:
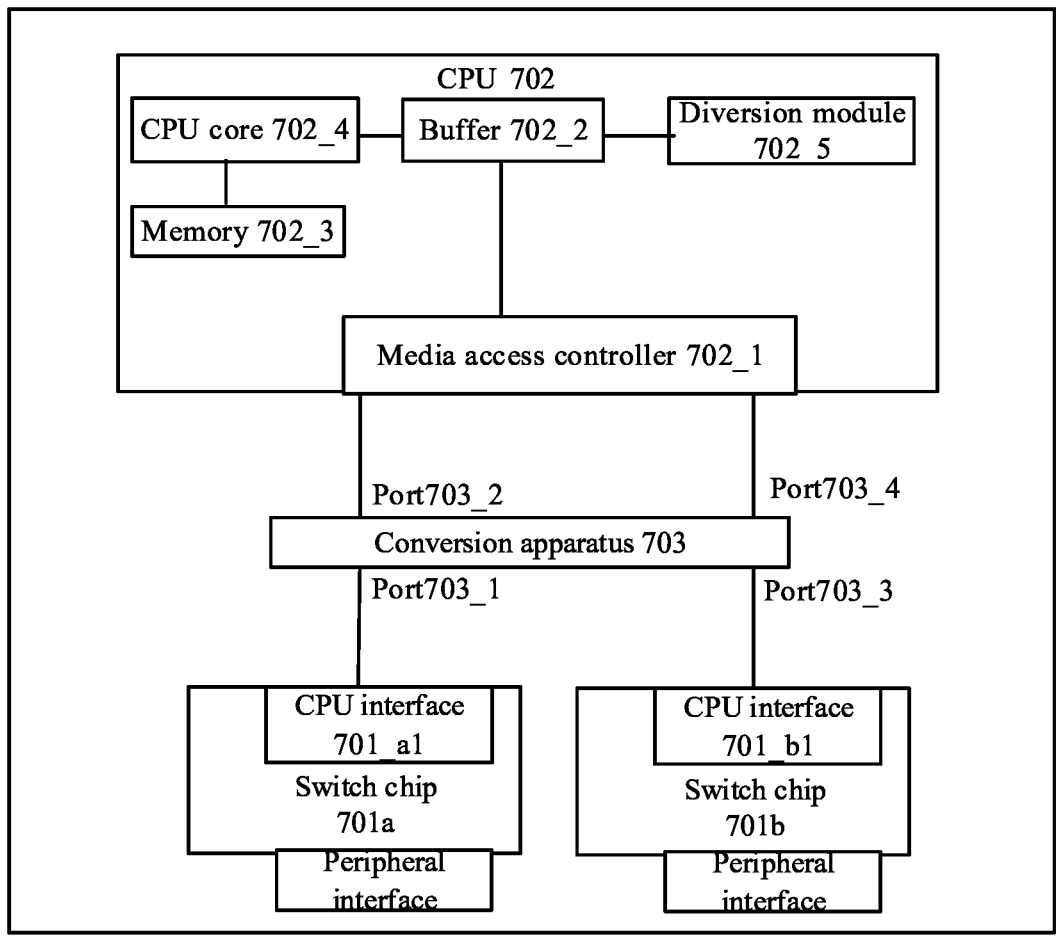
FIG. 7 is a schematic diagram illustrating a structure of a network device according to a fourth example of the present disclosure.

In the fourth example, the network device includes two switch chips. FIG. 7 is a schematic diagram illustrating a structure of a network device according to the fourth example of the present disclosure. In the structural diagram of the network device shown in FIG. 7, the network device may include a switch chip 701*a*, a switch chip 701*b*, a CPU 702 and a conversion apparatus 703.

In the fourth example, the structures of the switch chip 701*a* and the switch chip 701*b* are similar, and both the switch chip 701*a* and the switch chip 701*b* include a CPU interface and a peripheral interface. A CPU interface on the switch chip 701*a* is denoted as a CPU interface 701_*a*1, and a CPU interface on the switch chip 701*b* is denoted as a CPU interface 701_*b*1.

As shown in FIG. 7, the CPU 702 at least includes a media access controller 702_1, a buffer 702_2, a memory 702_3, a CPU core 702_4 and a diversion module 702_5.

In the fourth example, the conversion apparatus 703 is connected between the switch chip and the CPU. As shown in FIG. 7, the CPU interface 701_*a*1 of the switch chip 701*a* is connected with an interface (denoted as Port 703_1) at one end of the conversion apparatus 703, and an interface (denoted as Port 703_2) at the other end of the conversion apparatus 703 is connected with the media access controller 702_1 of the CPU 702. The CPU interface 701_*b*1 of the switch chip 701*b* is connected with an interface (denoted as Port 703_3) at one end of the conversion apparatus 703, and an interface (denoted as Port 703_4) at the other end of the conversion apparatus 703 is connected with the media access controller 702_1 of the CPU 702.

As shown in FIG. 7, when receiving a packet from the switch chip 701*a* through the interface Port 703_1, the conversion apparatus 703 identifies a private information header from an Ethernet header of the packet in a locally recorded manner corresponding to the interface Port 703_1 in which the private information header is identified, and then processes the packet in the manner in which the conversion apparatus processes the packet in the first example. Finally, the private information header of the packet that is from the switch chip 701*a* and buffered in the buffer 702_2 on the CPU 702 is located at the specified position (a position that is other than the Ethernet header and does not affect packet identification, for example, a position at the end of the Payload) of the packet. The conversion apparatus 703 processes the packets received from the switch chip 701*b* through the interface Port 703_2 in a similar manner.

It can be seen that, in the fourth example, no matter how many switch chips are included in the network device, the conversion apparatus 203 will finally migrate, in a unified way, the private information header of the packet from each switch chip to the specified position in the packet that is other than the Ethernet header and does not affect packet identification. In this case, even if the packet carries the private information header, the identification and normal diversion of the packets by the CPU (specifically, the diversion module 302_5) are not affected since the private information header is located at the position that is in the packet and does not affect packet identification.

Thus, descriptions of the fourth example are completed.

It is to be noted that the conversion apparatus 703 is connected between the switch chip and the CPU in the fourth example. The position of the conversion apparatus may also be as shown in the example 2 or 3 and thus will not be limited herein.

The present disclosure is described as above. A conversion apparatus according to the present disclosure is described below.

Figure 8:
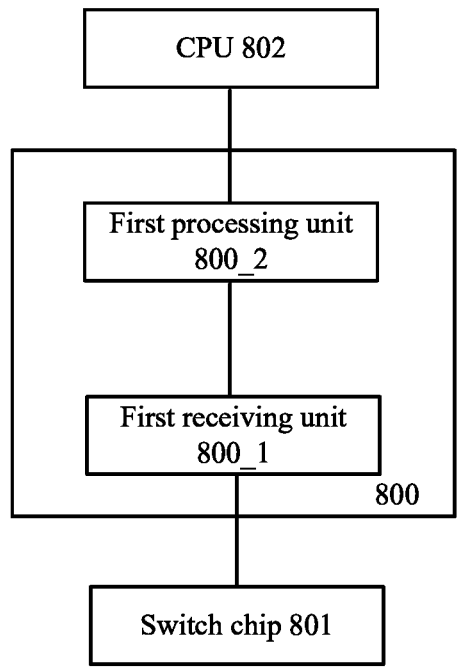
FIG. 8 is a schematic diagram illustrating a structure of a conversion apparatus according to an example of the present disclosure.

FIG. 8 is a schematic diagram illustrating a structure of a conversion apparatus according to an example of the present disclosure. The conversion apparatus (denoted as 800) shown in FIG. 8 may be applied to a network device. The network device herein may include a switch chip 801 and a CPU 802. As shown in FIG. 8, the conversion apparatus 800 is connected between the switch chip 801 and the CPU 802.

As shown in FIG. 8, the conversion apparatus 800 may include:

a first receiving unit 800_1, configured to receive a first packet, where the first packet is a packet uploaded by the switch chip 801 to the CPU 802; and a first processing unit 800_2, configured to obtain a second packet by migrating a private information header in an Ethernet header of the first packet to a specified position of the first packet, calculate a Cyclic Redundancy Check (CRC) code of the second packet, obtain a third packet by replacing a CRC code carried in the second packet with the calculated CRC code, and send the third packet to the CPU, where the specified position is a position other than the Ethernet header in the first packet.

In an example, the first processing unit 800_2 migrates the private information header in the Ethernet header of the first packet to the specified position of the first packet, including:

identifying the private information header from the Ethernet header of the first packet in a locally recorded manner in which the private information header is identified; and migrating the private information header from the Ethernet header of the first packet to the specified position of the first packet.

In an example, the specified position is the last N bytes in Ethernet Payload of the packet, and the N refers to the number of bytes occupied by the private information header.

Thus, descriptions of the structural diagram of the conversion apparatus shown in FIG. 8 are completed.

Figure 9:
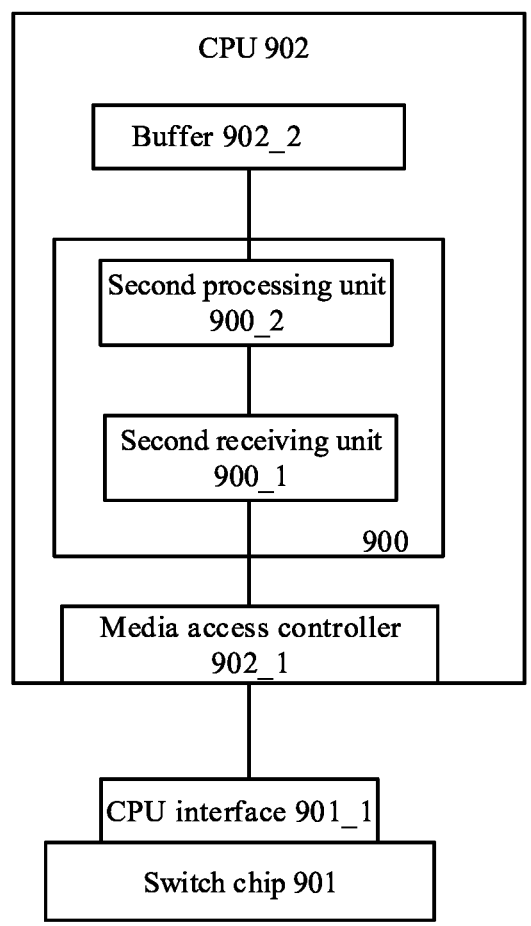
FIG. 9 is a schematic diagram illustrating a structure of another conversion apparatus according to an example of the present disclosure.

FIG. 9 is a schematic diagram illustrating a structure of another conversion apparatus according to an example of the present disclosure. The conversion apparatus (denoted as 900) shown in FIG. 9 may be applied to a network device. The network device herein may include a switch chip 901 and a CPU 902. The switch chip 901 at least includes a CPU interface 901_1, and the CPU 902 at least includes a media access controller 902_1 and a buffer 902_2.

As shown in FIG. 9, the conversion apparatus 900 is connected between the media access controller 902_1 and the buffer 902_2.

As shown in FIG. 9, the conversion apparatus 900 may include:
- a second receiving unit 900_1, configured to receive a first packet, where the first packet is a packet that is uploaded by the switch chip 901 to the CPU 902 through the CPU interface 901_1 and processed through the media access controller 902_1; and
- a second processing unit 900_2, configured to obtain a second packet by migrating a private information header in an Ethernet header of the first packet to a specified position of the first packet, calculate a Cyclic Redundancy Check (CRC) code of the second packet, obtain a third packet by replacing a CRC code carried in the second packet with the calculated CRC code, and send the third packet to the buffer for buffering, where the specified position is a position other than the Ethernet header.

In an example, the second processing unit 900_2 migrates the private information header in the Ethernet header of the first packet to the specified position of the first packet, including:
- identifying the private information header from the Ethernet header of the first packet in a locally recorded manner in which the private information header is identified; and
- migrating the private information header from the Ethernet header of the first packet to the specified position of the first packet.

In an example, the specified position is the last N bytes in the Ethernet Payload of the packet, and the N refers to the number of bytes occupied by the private information header.

Thus, descriptions of the structural diagram of the conversion apparatus shown in FIG. 9 are completed.

The foregoing descriptions are only preferred examples of the present disclosure but not intended to limit the present disclosure. Any modifications, equivalent substitutions, improvements and the like made within the spirit and principles of the present disclosure shall be encompassed in the scope of protection of the present disclosure.

The invention claimed is:

1. A network device, comprising:
a switch chip and
a Central Processing Unit (CPU),
wherein the switch chip at least comprises a CPU interface, and the CPU at least comprises a media access controller and a Buffer;
wherein the network device further comprises a conversion apparatus, the conversion apparatus is constituted by one of:
an apparatus comprising a processor and a memory, and a conversion chip, and
wherein the conversion apparatus is configured to:
receive a first packet uploaded by the switch chip to the CPU through the CPU interface,
obtain a second packet by migrating a private information header in an Ethernet header of the first packet to a specified position of the first packet,
calculate a Cyclic Redundancy Check (CRC) code of the second packet,
obtain a third packet by replacing a CRC code already carried in the second packet with the calculated CRC code, and
send the third packet to the Buffer on the CPU for buffering, and
wherein the specified position is a position other than the Ethernet header in the first packet.

2. The device according to claim 1, wherein the conversion apparatus is connected between the CPU interface and the media access controller;
wherein sending the third packet to the Buffer on the CPU for buffering comprises:
sending the third packet to the media access controller, so that the media access controller processes the third packet and stores the processed third packet in the Buffer.

3. The device according to claim 1, wherein the conversion apparatus is connected between the media access controller and the Buffer;
the first packet is a packet that is uploaded by the switch chip to the CPU through the CPU interface and processed by the media access controller.

4. The device according to claim 1, wherein the conversion apparatus and the media access controller are integrated in a same module.

5. The device according to claim 1, wherein the conversion apparatus migrates the private information header in the Ethernet header of the first packet to the specified position of the first packet, comprising:
identifying the private information header from the Ethernet header of the first packet in a locally recorded manner in which the private information header is identified; and
migrating the private information header from the Ethernet header of the first packet to the specified position of the first packet.

6. The device according to claim 5, wherein the manner in which the private information header is identified is pre-configured in the conversion apparatus; or
the manner in which the private information header is identified is determined by the conversion apparatus according to a chip identifier of the switch chip.

7. The device according to claim 1, wherein the specified position is the last N bytes in an Ethernet Payload of the packet; and
N refers to the number of bytes occupied by the private information header.

8. The device according to claim 1, wherein the CPU further comprises a memory and a CPU core;
the memory is configured to store instruction codes, and
the CPU core is configured to read and run the instruction codes from the memory when obtaining information in the private information header, so as to obtain the information in the private information header from the specified position of the third packet.

9. A conversion apparatus, wherein, the conversion apparatus is applied to a network device which comprises a switch chip and a CPU,
the conversion apparatus is constituted by one of:
an apparatus comprising a processor and a memory, and a conversion chip,
the conversion apparatus is connected between the switch chip and the CPU, and
the conversion apparatus is configured to:

receive a first packet, wherein the first packet is a packet uploaded by the switch chip to the CPU;

obtain a second packet by migrating a private information header in an Ethernet header of the first packet to a specified position of the first packet, calculate a Cyclic Redundancy Check (CRC) code of the second packet, obtain a third packet by replacing a CRC code already carried in the second packet with the calculated CRC code, and send the third packet to the CPU, and wherein the specified position is a position other than the Ethernet header in the first packet.

10. The apparatus according to claim 9, wherein, migrating the private information header in the Ethernet header of the first packet to the specified position of the first packet comprises:

identifying the private information header from the Ethernet header of the first packet in a locally recorded manner in which the private information header is identified; and migrating the private information header from the Ethernet header of the first packet to the specified position of the first packet.

11. A conversion apparatus, wherein, the conversion apparatus is applied to a network device which comprises a switch chip and a CPU, the switch chip at least comprises a CPU interface, the CPU at least comprises a media access controller and a Buffer;

the conversion apparatus is constituted by one of:

an apparatus comprising a processor and a memory, and a conversion chip, the conversion apparatus is connected between the media access controller and the Buffer; and the conversion apparatus is configured to:

receive a first packet, wherein the first packet is a packet that is uploaded by the switch chip to the CPU through the CPU interface and processed by the media access controller;

obtain a second packet by migrating a private information header in an Ethernet header of the first packet to a specified position of the first packet, calculate a Cyclic Redundancy Check (CRC) code of the second packet, obtain a third packet by replacing a CRC code already carried in the second packet with the calculated CRC code, and send the third packet to the Buffer for buffering, wherein the specified position is a position other than the Ethernet header in the first packet.

12. The apparatus according to claim 11, wherein, migrating the private information header in the Ethernet header of the first packet to the specified position of the first packet comprises:

identifying the private information header from the Ethernet header of the first packet in a locally recorded manner in which the private information header is identified; and migrating the private information header from the Ethernet header of the first packet to the specified position of the first packet.

\* \* \* \* \*